United States Patent

Hoy

[15] 3,699,337
[45] Oct. 17, 1972

[54] PERSONNEL NEUTRON DOSIMETER

[72] Inventor: John E. Hoy, North Augusta, S.C.

[73] Assignee: The United States of America as represented by the United States Atomic Energy Commission

[22] Filed: March 16, 1971

[21] Appl. No.: 124,685

[52] U.S. Cl. ............................. 250/83.1, 250/71.5 R
[51] Int. Cl. .............................................. G01t 3/00
[58] Field of Search ........................ 250/71.5 R, 83.1

[56] References Cited

UNITED STATES PATENTS

| | | | |
|---|---|---|---|
| 3,562,480 | 2/1971 | Korba | 250/83.1 |
| 3,372,275 | 3/1968 | Kocher | 250/83.1 |
| 3,399,301 | 8/1968 | Schayes et al. | 250/83.1 X |

Primary Examiner—James W. Lawrence
Assistant Examiner—Davis L. Willis
Attorney—Ronald A. Anderson

[57] ABSTRACT

A dosimeter is disclosed for measuring the neutron dose equivalent for spectra of widely different energy distributions. A hemispherical mass of neutron moderating material is divided into two segments by a layer of thermal neutron absorbing material. Each segment has a thermal neutron detector at its base surface. Another layer of thermal neutron absorbing material covers the curved surface of the hemispherical mass but has a portion of reduced thickness at the apex. Neutrons passing through and backscattered from the wearer are monitored by one of the neutron detectors while the second detector corrects for directly impinging thermal neutrons that contribute a disproportionately small amount to dose.

7 Claims, 2 Drawing Figures

PATENTED OCT 17 1972                                    3,699,337

INVENTOR.
JOHN E. HOY
BY

PERSONNEL NEUTRON DOSIMETER

BACKGROUND OF THE INVENTION

The invention described herein was made in the course of or under a contract with the U.S. Atomic Energy Commission.

1. Field of Invention

The present invention relates to a personnel dosimeter for estimating neutron radiation dose equivalent sustained by an individual exposed to a mixed field of radiation which may include neutron, gamma, beta and alpha radiation of various energies. It is particularly useful for estimating dose equivalent sustained by an individual exposed to neutron radiation having a wide range of neutron energies with a substantial portion below 1 MeV such as is produced by $^{252}$Cf, $^{244}$CmO$_2$, $^{239}$PuF and moderated or shielded neutron sources.

Dose equivalent is a measure of the biological risk produced by absorption of a given quantity of radiation energy by biological tissue. Normally dose equivalent is expressed in rem units. A rem is based on the absorption of 1 rad, e.g. 100 ergs of radiation energy per gram of soft tissue equivalent material. (See National Bureau of Standards Handbook 85, "Physical Aspects of Irradiation", Appendix I, p. 100, 1964.) Low energy and thermal neutrons contribute a disproportionately small amount to dose equivalent in comparison to that contributed by an equal number of higher energy neutrons. Consequently, a mere radiation flux measurement is inadequate for dose equivalent determinations.

2. Description of Prior Art

Personnel dosimeters employing film (nuclear track emulsions) have been used for neutron measurements in the past, but these type dosimeters are essentially nonresponsive to neutrons within the 0.1 ev to about 500,000 ev energy range. Although emulsion film responds to thermal neutrons below about 0.1 ev, it is generally necessary to shield the film from thermal neutron flux to avoid an exaggerated dose measurement. However, in so doing, the dose equivalent contribution of thermal neutrons is not taken into account. Neutron energies below 500,000 ev are often encountered in processing handling and using radioactive materials such as $^{239}$Pu, $^{244}$Cm and $^{252}$Cf. For example, neutron radiation produced by the $(\alpha,n)$ reaction occurring in $^{239}$PuF is for the most part below 1 MeV, and about one quarter of the radiation produced by $(\alpha,n)$ reaction in $^{244}$CmO$_2$ and the spontaneous fission of $^{252}$Cf are below 1 MeV. When neutron shielding is added for personnel protection a larger fraction of the neutrons from these and other sources are moderated so that their energies are within the region where the film is inadequate.

A partial solution to this problem is described in U.S. patent entitled "Thermoluminescent Dosimeter Badge" by Alvin Korba, Ser. No. 844,821 issued Feb. 9, 1971, Pat. No. 3,562,480. This earlier dosimeter includes two hemispheres of hydrogenous material each having a thermal neutron detector at its base surface. The curved surface of one hemisphere and the entire surface of the other hemisphere are covered with cadmium to block thermal neutrons. Both of the hemispheres are mounted in a holder for wearing with their base surfaces against an individual. Neutron flux is moderated by the body and the hydrogenous hemispheres before registering on the thermal neutron detectors. The detector reading can be used to estimate dose equivalent sustained by the wearer.

However, it has been found that this previous dosimeter badge has several disadvantages that limits its accuracy and acceptance. The badge is fairly large and it is difficult to maintain both hemispheres snugly against the wearer as required for accurate dosimetric measurements. Although it is more accurate than film type devices, it over responds to neutron spectra including a large number of thermal neutrons. In addition the cadmium exterior is eroded by wear and is slightly toxic to detract from its acceptability by the wearer.

SUMMARY OF THE INVENTION

Therefore it is an object of the present invention to provide a more accurate personnel neutron dosimeter for use in a mixed radiation field.

It is a further object to provide a neutron dosimeter having greater acceptability for the wearer.

It is also an object to provide a personnel neutron dosimeter that accurately compensates for the dosimeter response to thermal neutron flux in dose equivalent determinations.

In accordance with the present invention there is provided an improved personnel dosimeter for measuring neutron dose equivalent over a wide energy range in the presence of a mixed radiation field. The dosimeter includes a generally hemispherical mass of neutron moderating material divided into two segments by a layer of thermal neutron absorbing material, such as cadmium, between the base surface of the first segment and the top surface of the second segment. A thermal neutron detector is disposed at the base surface of each of the two segments. Another layer of thermal neutron absorbing material covers the curved surfaces of both segments except that an opening or portion of reduced thickness is included to permit passage of some thermal neutrons into the first segment. Structural means are provided for maintaining the base of the second segment snugly against the wearer and the curved surface of the hemisphere projecting outwardly. The reading obtained from the detector in the outwardly disposed first segment beneath the portion of reduced thickness is deducted from the reading obtained from the detector disposed in the second segment adjacent to the wearer. This computation compensates for directly impinging thermal neutrons that do not proportionately contribute to actual dose equivalent sustained by the wearer.

BRIEF DESCRIPTION OF THE DRAWINGS

The present invention is illustrated in the accompanying drawings wherein.

DETAILED DESCRIPTION OF THE PREFERRED EMBODIMENT

Figure 1:
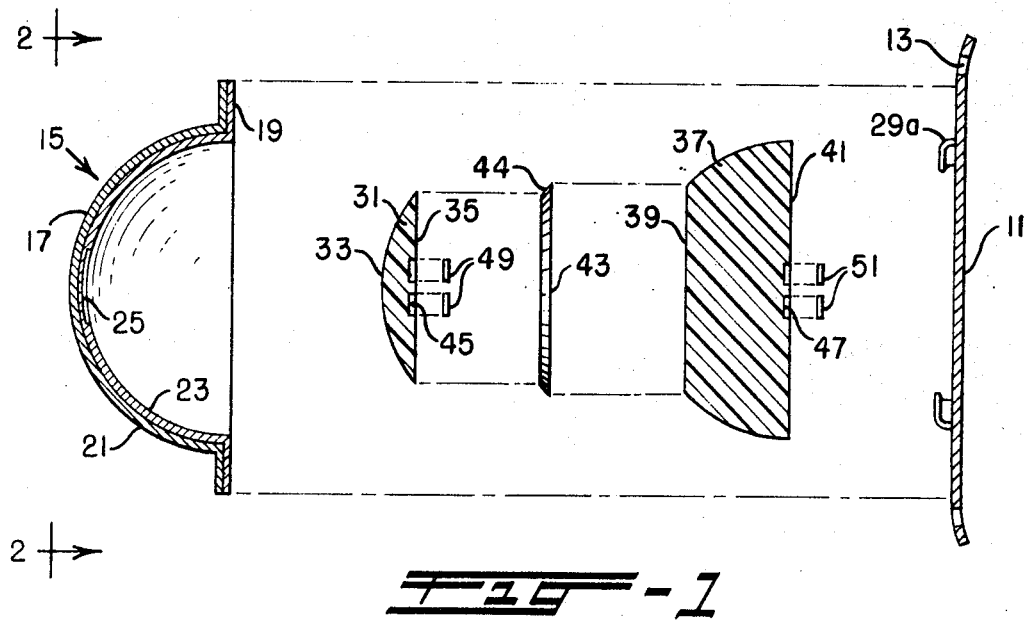
FIG. 1 is an exploded cross sectional view of a personnel neutron dosimeter.
Figure 2:
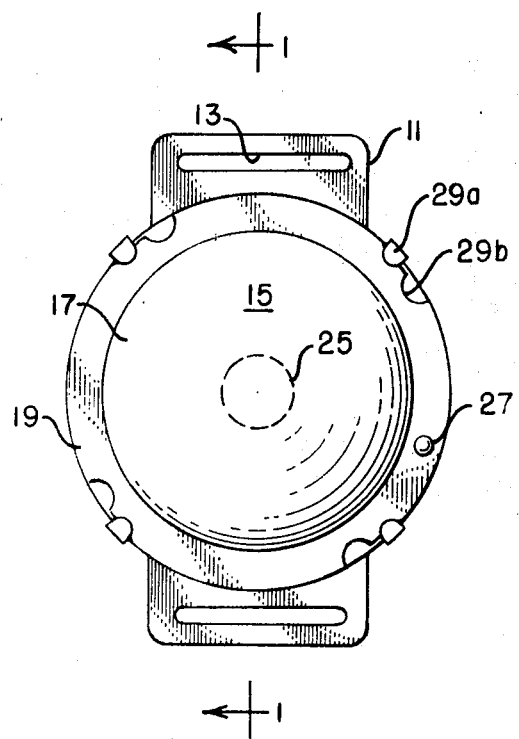
FIG. 2 is an assembled front view of the dosimeter of FIG. 1.

Referring now to FIGS. 1 and 2 there is shown a base plate 11 of an inert metal such as stainless steel that is generally chemically inert, transparent to neutron flux and nontoxic to the wearer. Belt slots 13 are provided on opposite ends of the base plate 11 for receiving the wearer's belt and thereby snugly holding the dosimeter flat against the body. The end portions of plate 11 are curled towards the wearer to facilitate passage of the belt through slots 13.

A dome member 15 is formed with a central hemispherical shaped portion 17 and a circular flange portion 19 around its periphery. Member 15 is of bonded laminated construction with an outer layer 21 of inert material similar to that used in base plate 11 and an inner layer 23 of thermal neutron absorbing material. Although cadmium has been used in the present embodiment for layer 23, other thermal neutron absorbing materials such as boron, silver or indium might also be employed. The inner layer 23 is made sufficiently thick, e.g. 0.8 mm or more of cadmium, to block substantially all thermal neutrons but includes a portion of reduced thickness 25 shown at the apex of hemispherical portion 17. The thickness of portion 25 may vary from the normal thickness of inner layer 23 to a very thin film or even an absence of thermal neutron absorbing material depending on the application as will be later discussed. Moreover its size, shape and location may also be altered for a particular application.

Twist-lock latch members 29a and 29b are provided on the base plate 11 and flange portion 19 of dome member 15 to securely fasten the dosimeter together but allow quick and easy assembly and disassembly. Both flange portion 19 and base plate 11 are provided with an aperture for inserting a breakable seal or plastic rivet 27. Rivet 27 insures consistent orientation of the dome member 15 and prevents tampering with the dosimeter during use.

The inner volume under the hemispherical portion 17 of dome member 15 contains components employed in the dosimetric determinations. There is provided a first generally hemispherical segment 31 of a suitable neutron moderating material, for instance of polyethylene. Segment 31 has a curved surface 33 disposed towards the portion of reduced thickness 25 in layer 23 and an oppositely facing flat base surface 35. A second segment 37 is shown as the truncated portion of a hemisphere having a flat top surface 39 facing first segment 31 and a flat base surface 41 facing base plate 11. Segment 37 is composed of similar material to that employed in segment 31 but is generally of substantially larger mass than segment 31.

A wafer or disk 43 of a neutron absorbing material similar to that used in layer 23 is disposed between flat surfaces 35 and 39 of the first and second hemispherical segments 31 and 37 respectively. The edge surface 44 of disk 43 is tapered or rounded to correspond to the curvature of inner layer 23 within dome member 15 and thereby provide a surface to surface seal when assembled therein.

The flat base surfaces 35 and 41 of the two hemispherical segments 31 and 37 are provided with suitable indentations 45 and 47 at or near the surfaces' centers for receiving thermal neutron detecting elements 49 and 51 respectively. Elements 49 and 51 can each be a pair of $^6$LiF, $^7$LiF thermoluminescent dosimeter phosphors as shown. Other thermal neutron detection means such as activation foils of, for instance indium or gold, and commercially available fission fragment detectors containing fissionable material and etchable plastic could also be employed. However, the pair of $^6$LiF, $^7$LiF phosphors are preferred due to their light weight, accuracy and ability to estimate gamma radiation in addition to thermal neutron detection.

In employing the present dosimeter, it is suitably attached with the base plate 11 flat against the wearer's body and the dome member 15 pointed outwardly. For example, an ordinary belt may be threaded through slots 13 and secured at the wearer's waist. Neutron radiation entering the wearer's body is moderated to a lower energy and a portion thereof passes or is back scattered to the back plate 11 of the personnel dosimeter. Since back plate 11 is transparent to neutrons, the radiation is caught and further moderated in truncated hemispherical segment 37. Neutron radiation tending to pass through segment 37 is significantly reflected back from cadmium disk 43 and the back portion of layer 23. Thermal neutrons impinging on detection element 51 are sensed for subsequent readout.

In an embodiment employing $^6$LiF and $^7$LiF phosphors, thermal neutron response is obtained by deducting the thermoluminescent reading of a $^7$LiF phosphor from that of a corresponding $^6$LiF phosphor. Generally speaking the $^6$LiF senses gamma photons and thermal neutrons while the $^7$LiF phosphors detect only gamma photons. By subtracting the latter from the former the gamma contribution is eliminated from the $^6$LiF reading but, an indication of gamma dose can be obtained from the $^7$LiF phosphor. Both LiF phosphors are read by methods well known in the art. (See CAMERON et al., THERMOLUMINESCENT DOSIMETRY 75–100, University of Wisconsin Press, 1968.)

Thermal and low energy neutrons impinging directly on the person contribute a disproportionately small amount to dose equivalent. Consequently a corrective measurement is made by the thermal neutron detecting element 49 disposed in hemispherical segment 31. Most thermal neutrons impinging on dome member 15 from an outside source will be reflected or absorbed in neutron absorbing layer 23. Thermal neutrons approaching segment 31 from the rear are blocked by disk 43. Most higher energy neutrons passing through layer 23 will not be sensed by detector 49 due to the relatively small mass of moderator in hemispherical segment 31. Low energy and thermal neutrons enter segment 31 through the portion of reduced thickness 25 in layer 23 and are detected by element 49. The reading from element 49 is deducted from the reading obtained in element 51 to provide a measurement that is correlatible to radiation dose equivalent.

The dimensions, shape, location and thickness of the portion of reduced thickness 25 can be determined by empirical methods. A personnel dosimeter with a particular portion 25 is fabricated and attached to a phantom moderator to simulate the wearer. It is exposed to various but measured neutron sources and the dose reading from the dosimeter compared with dose equivalent values calculated from the known spectra and flux.

In the development of the present embodiment, neutron spectra from several sources including unmoderated PuBe (about 4 MeV average), unmoderated PuF$_4$ (about 800 KeV average), slightly moderated PuF$_4$ (30% neutron flux <0.5 MeV), PuBe moderated by 150 mm D₂O (50% neutron flux <0.5 MeV), PuBe moderated by 300 mm D₂O (70% neutron flux <0.5 MeV) were separately established for exposure of a personnel dosimeter having a one-half inch circular opening through a layer 23 of cadmium at portion 25. It was found that the dose measurements were within about 25% from the calculated values. Subsequently a thin film of cadmium, about 0.008 mm thick, was disposed over portion 25 and the tests repeated. The modified dosimeter gave more consistent results that deviated from the calculated values by only about 20%. Other tests conducted with the same neutron sources showed a deviation of about 40% from calculated values when no opening or portion of reduced thickness 25 was included in layer 23. This deviation compares with that obtained from the thermoluminescent dosimeter badge of U.S. Pat. No. 3,562,480 but is considerably less than those obtained from film badges. Consequently, a usable personnel dosimeter can be provided with an opening at portion 25 or with portion 25 of any thickness up to the thickness of layer 23. More precise dosimetry can be obtained by empirically tailoring the shape, size and thickness of portion 25 to the expected neutron spectra.

The personnel dosimeter of the present invention provides more accurate dose equivalent determinations than prior devices, especially in applications having mixed fields of radiation including a large thermal neutron flux. It is small, light weight and is easily carried on the wearer's belt. Outside surfaces are covered with an inert metal to protect the dosimetric components and prevent contact of toxic substances with the wearer.

What is claimed is:

1. In a personnel dosimeter for measuring neutron dose equivalent over a wide neutron energy spectrum wherein said dosimeter includes first and second segments of neutron moderating material, each of said segments having curved and base surfaces, first and second thermal neutron detectors respectively disposed at a base surface of each segment, a layer of thermal neutron absorbing material disposed over the curved surface of each segment and the base surface of one of said segments, and structural means for supporting said dosimeter adjacent to an individual with said curved surfaces projecting outwardly from said individual, the improvement comprising:

A. said first and second segments being apex and truncated segments of a single generally hemispherical mass of neutron moderating material;
   B. said layer of neutron absorbing material having a portion of reduced thickness on the curved surface of said apex segment for admitting thermal neutrons; and
   C. said structural means including a substantially neutron transparent base plate of inert metal aligned with the base surface of said generally hemispherical mass, said base plate having attachment means adjacent to opposing circumferential portions of said mass for maintaining said base plate firmly against said individual.

2. The dosimeter of claim 1 wherein said structural means includes a substantially neutron transparent external covering of inert metal over the curved surfaces of said segments outside said layer of thermal neutron absorbing material.

3. The dosimeter of claim 1 wherein said portion of reduced thickness comprises an opening through said layer of thermal neutron absorbing material.

4. The dosimeter of claim 1 wherein said attachment means comprises slotted openings through said base plate on opposite sides of said mass for receiving a belt member attached to said individual.

5. The dosimeter of claim 1 wherein said thermal neutron detectors comprise ⁶LiF and ⁷LiF thermoluminescent phosphors.

6. The dosimeter of claim 1 wherein said layer of thermal neutron absorbing material comprises cadmium.

7. The dosimeter of claim 1 wherein said apex segment is of smaller mass than said truncated segment.

* * * * *